No. 711,395. Patented Oct. 14, 1902.
S. GREGORY.
COMBINED HUB SPINDLE AND THIMBLE.
(Application filed May 22, 1902.)
(No Model.)

WITNESSES:

INVENTOR
Stephen Gregory
BY
ATTORNEYS.

UNITED STATES PATENT OFFICE.

STEPHEN GREGORY, OF TRINIDAD, COLORADO.

COMBINED HUB SPINDLE AND THIMBLE.

SPECIFICATION forming part of Letters Patent No. 711,395, dated October 14, 1902.

Application filed May 22, 1902. Serial No. 108,487. (No model.)

*To all whom it may concern:*

Be it known that I, STEPHEN GREGORY, a citizen of the United States, and a resident of Trinidad, in the county of Las Animas and State of Colorado, have invented a new and Improved Combined Hub Spindle and Thimble, of which the following is a full, clear, and exact description.

The purpose of my invention is to provide a combination of hub spindle and thimble which will insure a hub remaining and properly turning upon the spindle in the presence of a lubricant until purposely removed and which will prevent undue lateral movement of the hub or undue wear and tear upon the spindle and the hub-thimble.

Another purpose of the invention is to provide a construction whereby the spindle of an axle will be detachable and means whereby the hub can be quickly and conveniently locked upon the spindle and the outer end of the spindle so protected that no portion of the person or clothing will be soiled by grease should it happen to be brought in engagement with the outer end of the cap-band of the hub, since said band is closed at its end.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
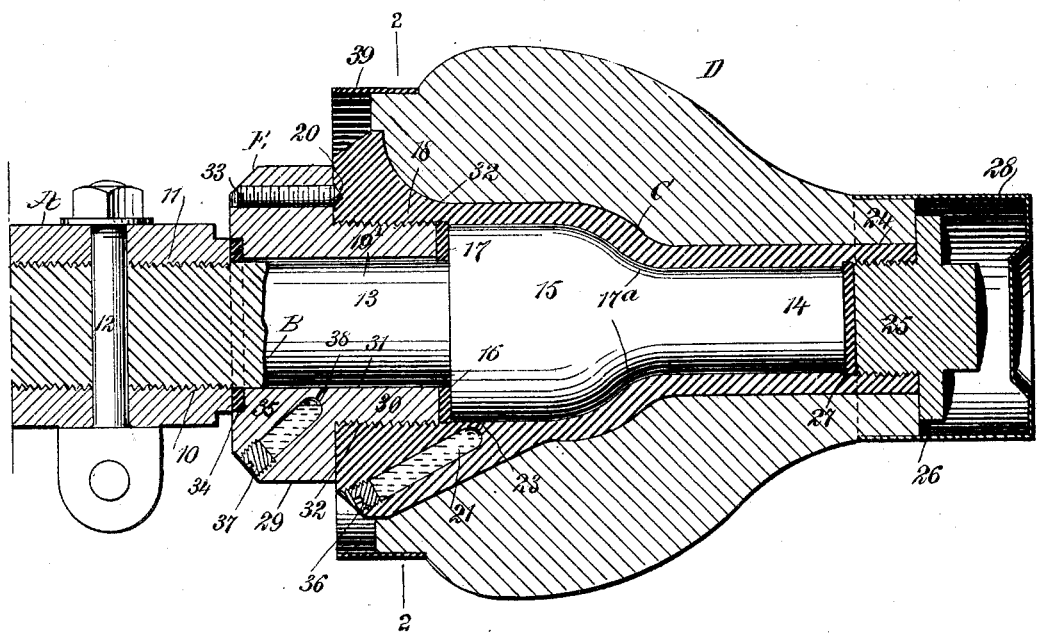
Figure 2:
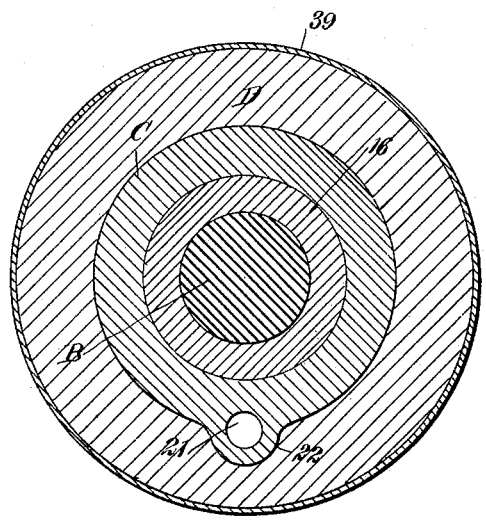

Figure 1 is a longitudinal section through the hub spindle and thimble and a section through that portion of the axle to which the spindle is attached, and Fig. 2 is a transverse section taken practically on the line 2 2 of Fig. 1.

The axle A is provided at each end with a chamber 11, the wall of which is threaded, and each chamber is circular in cross-section to receive the inner end of the spindle B, also circular in cross-section and provided with an exterior thread 10, as is shown in Fig. 1, and to prevent the spindle becoming accidentally loosened from the axle a bolt 12 is passed through the mating portions of the spindle and axle, as is also shown in Fig. 1. The bolts 12 in the rear axle are utilized to hold the reach-braces thereon, while the corresponding bolts on the forward axle are used to secure the thill-couplings thereto.

Adjoining the inner threaded surface of a spindle B an exteriorly-plain surface 13 of the same diameter is formed, and at the outer end of the spindle a correspondingly plain section 14 is provided, while between the two sections 13 and 14 a circumferentially-enlarged intermediate section 15 is formed, which presents an annular shoulder 17 where it faces the inner section 13 and is given a tapering surface 17$^a$ where it connects with the outer or forward end section 14, as is also shown in Fig. 1, the tapering surface 17$^a$ being more or less on the lines of a compound curve.

A thimble C exteriorly and interiorly corresponds to the exterior surface of the spindle B from and including the enlarged section 15 and outer end section 14 of the spindle, and said thimble extends inward beyond the shoulder 17 of the spindle with the same interior diameter as the diameter of the spindle at said shoulder, and the rear projecting portion 18 of the thimble is provided with an interior thread 19.

The inner projecting portion 18 of the thimble C is of greater thickness than its other portions, and at one point in the inner end surface of the thimble C, preferably at the inner portion of said thimble, one or more cavities 20 are produced, and likewise a chamber 21, adapted to contain a lubricating material, is produced in an offset 22 from the thimble, as is shown best in Fig. 2. This lubricating-chamber 21 is preferably diagonal with reference to the longitudinal axis of the thimble, as is shown in Fig. 1, connecting with the interior of the thimble where it engages with the enlarged section 15 of the spindle B through a channel 23, as is also shown in Fig. 1.

The forward and outer end of the thimble C extends beyond the corresponding end of the spindle B, and the section 24 of the thimble C is interiorly threaded to receive a tap-nut 25, having a flange 26. The hub D is fitted upon the thimble C in any approved manner and extends from a point near the inner end of the thimble to its outer end. After said nut 25 is screwed into the thimble against a suitable washer 27, which washer bears upon the outer end of the spindle B, a cap-band 28 is secured upon the outer end of the hub, completely inclosing and concealing the outer end portion of the hub and the tap-nut 25, thereby preventing any object or article which may come in contact with the outer end of the hub from being soiled by grease, as frequently happens when the tap-nut is exposed. When the tap-nut 25 is in position, its flange 26 engages with the outer end of the hub D.

The hub D and the thimble C are held in position on the spindle B by means of a hub-nut E, which hub-nut is in two sections—an inner section 29 and an outer or forward section 30, of less diameter than the inner or rear section 29—and the forward or outer reduced section 30 of the hub-nut E is provided with an exterior thread 32, as is shown in Fig. 1. Both sections 29 and 30 of the nut are provided with a smooth bore 31, enabling the said hub-nut to fit loosely upon the plain cylindrical section 13 of the aforesaid spindle B. The threaded portion of the nut E is screwed into the projecting inner end portion 18 of the thimble C to an engagement with the washer 16, bearing against the shoulder 17 of the said spindle, as is also shown in Fig. 1. The hub-nut E is prevented from accidentally becoming loose by passing a screw 33 through the smooth bore in the larger portion of the nut and into one of the cavities 20, heretofore mentioned as produced in the inner end of the thimble C.

The nut E when in position engages with a washer 34, and this washer engages with the outer end of the axle A. At the lower portion of the hub-nut E an inclined oil-chamber 35 is formed, communicating with the bore 31 in the nut E through the medium of a channel 38. The oil-chamber 21 in the thimble C is closed at its outer end, preferably, by a screw-plug 36, and a like plug 37 is employed to close the lubricating-chamber 35 in the nut E, as is also shown in Fig. 1. The ordinary hub-band 39 is secured to the hub at its inner end, extending over the corresponding portion of the thimble C.

It will be observed that when a wheel is mounted as above set forth it is impossible for the wheel to leave the spindle on which it is mounted, and, furthermore, the bearing for the hub is constantly lubricated and is practically antifriction and dust proof.

The hub may be readily removed whenever desired by detaching from the axle the spindle on which the hub is mounted and unscrewing the hub-nut E, which is adapted to remain permanently on the spindle, while the hub and its attached thimble may be readily removed by being slipped off from the outer end of the spindle.

Having thus described my invention, I claim as new and desire to secure by Letters Patent—

1. The combination with a spindle having an enlarged section intermediate of its ends, presenting a shoulder to the inner end of the spindle and gradually tapering to meet the exterior surface of the opposite end of the spindle, a thimble fitted to the exterior diameter of the said spindle at its forward and at its intermediate enlarged portion, the said thimble extending beyond the shoulder of the enlarged section of the spindle and beyond the outer end of the spindle, both projecting portions of the thimble being interiorly threaded, a hub secured to the said spindle, a tap-nut screwed into the outer end portion of the said thimble and engaging with the corresponding end portion of the hub, and a nut loosely mounted upon the forward portion of the spindle and having a threaded section which enters the extending inner end portion of the said thimble, for the purpose described.

2. The combination with a spindle having an enlarged section intermediate of its ends, presenting a shoulder to the inner end of the spindle and gradually tapering to meet the exterior surface of the opposite end of the spindle, a thimble fitted to the exterior diameter of the said spindle at its forward and at its intermediate enlarged portion, the said thimble extending beyond the shoulder of the enlarged section of the spindle and beyond the outer end of the spindle, both projecting portions of the thimble being interiorly threaded, a hub secured upon the said spindle, a tap-nut screwed into the outer end portion of the hub, a nut loosely mounted upon the forward portion of the spindle and having a threaded section which enters the extending inner end portion of the said thimble, an oil-chamber located in the said thimble, being in communication with the interior thereof, a like chamber formed in the nut at the inner end of the thimble, being in communication with the bore of the said nut, and a locking device for the nut at the inner end of the thimble, engaging with the inner end portion of the thimble, for the purpose specified.

3. The combination with a spindle having an enlarged section intermediate of its ends, presenting a shoulder to the inner end of the spindle and gradually tapering to meet the exterior surface of the opposite end of the spindle, a thimble fitted to the exterior diameter of the said spindle at its forward and at its intermediate enlarged portion, the said thimble extending beyond the shoulder of the enlarged section of the spindle and beyond the outer end of the spindle, both projecting portions of the thimble being interiorly threaded, a hub secured to the said spindle, a tap-nut screwed into the outer end portion of said thimble and engaging with the corresponding end portion of the hub, a nut loosely mounted upon the forward portion of the spindle and having a threaded section which enters the extending inner end portion of the said thimble, an oil-chamber located in said thimble, being in communication with the interior thereof, a like chamber formed in the nut at the inner end of the thimble, being in communication with the bore of said nut, a locking device for the nut at the inner end of the thimble, engaging with the inner end portion of the thimble, a cap-band secured to the outer end of said hub inclosing and concealing the nut at the outer end of the said thimble an exterior thread at the inner end of the said spindle at the rear of the rear lock-nut for the hub, and an axle having a threaded chamber to receive the threaded inner end of the spindle, for the purpose described.

In testimony whereof I have signed my name to this specification in the presence of two subscribing witnesses.

STEPHEN GREGORY.

Witnesses:
    D. W. ROE,
    VIDAL SHOBLO.